US009803777B2

(12) United States Patent
Mackie et al.

(10) Patent No.: US 9,803,777 B2
(45) Date of Patent: Oct. 31, 2017

(54) ATTENUATING DEVICE FOR VALVE ASSEMBLY

(71) Applicant: Dresser, Inc., Addison, TX (US)

(72) Inventors: Kevin James Mackie, Mansfield, MA (US); Harold Randall Smart, Portsmouth, RI (US)

(73) Assignee: Dresser, Inc., Addison, TX (US)

( * ) Notice: Subject to any disclaimer, the term of this patent is extended or adjusted under 35 U.S.C. 154(b) by 85 days.

(21) Appl. No.: 14/469,683

(22) Filed: Aug. 27, 2014

(65) Prior Publication Data
US 2016/0061482 A1 Mar. 3, 2016

(51) Int. Cl.
*F16K 37/00* (2006.01)

(52) U.S. Cl.
CPC .............................. *F16K 37/0008* (2013.01)

(58) Field of Classification Search
CPC ................................................. F16K 37/0008
USPC ..... 116/277, 283; 137/553, 554, 556, 556.3; 251/77, 337
See application file for complete search history.

(56) References Cited

U.S. PATENT DOCUMENTS

| | | | | |
|---|---|---|---|---|
| 2,787,126 A | * | 4/1957 | Kleczek | F16K 31/122 251/77 |
| 3,056,381 A | * | 10/1962 | Barnett | F25B 49/02 116/282 |
| 3,225,785 A | * | 12/1965 | Goike | F22D 5/26 137/486 |
| 3,362,535 A | * | 1/1968 | Kasten | B01D 35/143 210/323.2 |
| 3,889,922 A | * | 6/1975 | Peters | F16K 31/143 137/553 |
| 4,133,288 A | * | 1/1979 | Burgess | F16K 37/0008 137/553 |
| 4,361,167 A | * | 11/1982 | Harasewych | F01P 11/20 251/77 |
| 4,463,929 A | * | 8/1984 | Dantlgraber | F16K 17/04 251/77 |
| 4,721,284 A | * | 1/1988 | Bankard | F16K 1/54 251/61.5 |
| 4,836,974 A | * | 6/1989 | Ezekoye | F16K 37/0008 137/553 |
| 4,879,511 A | * | 11/1989 | Leon | F16K 37/0083 137/554 |
| 4,926,903 A | * | 5/1990 | Kawai | G01F 1/26 137/554 |

(Continued)

*Primary Examiner* — Eric Keasel
(74) *Attorney, Agent, or Firm* — Paul Frank + Collins P.C.

(57) ABSTRACT

An attenuating device that is configured to replace motion converters in conventional control valve assemblies. The attenuating device can generate an output displacement in response to a position of a plug relative to a seat in the valve assembly. In one embodiment, the attenuating device comprises a spring assembly with a pair of spring members, disposed in series, and configured to assume a deflection that reduces the displacement of the plug to a smaller displacement that is useful to position a target member of a sensor. This embodiment, however, forgoes the mechanisms of conventional devices in lieu of components that are amenable to compact design. In this way, the attenuating device can substantially fit within the existing structure of the valve assembly, and, in one construction, the attenuating device is disposed in the actuator of the valve assembly.

20 Claims, 7 Drawing Sheets

(56) References Cited

U.S. PATENT DOCUMENTS

| | | | | |
|---|---|---|---|---|
| 5,039,061 A | * | 8/1991 | Heard | F16K 31/086 |
| | | | | 137/553 |
| 5,115,186 A | * | 5/1992 | Reinartz | B60T 7/042 |
| | | | | 324/207.2 |
| 5,213,057 A | * | 5/1993 | Muller | F16K 37/0008 |
| | | | | 137/553 |
| 5,277,223 A | | 1/1994 | Glockner et al. | |
| 7,533,589 B2 | | 5/2009 | Tondolo | |

* cited by examiner

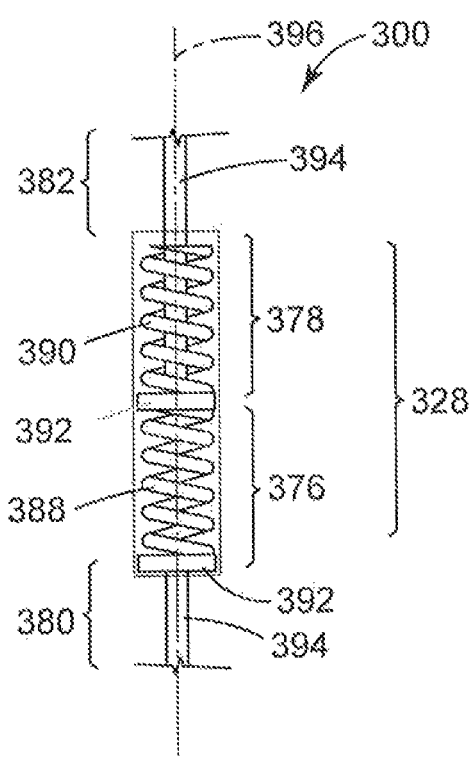

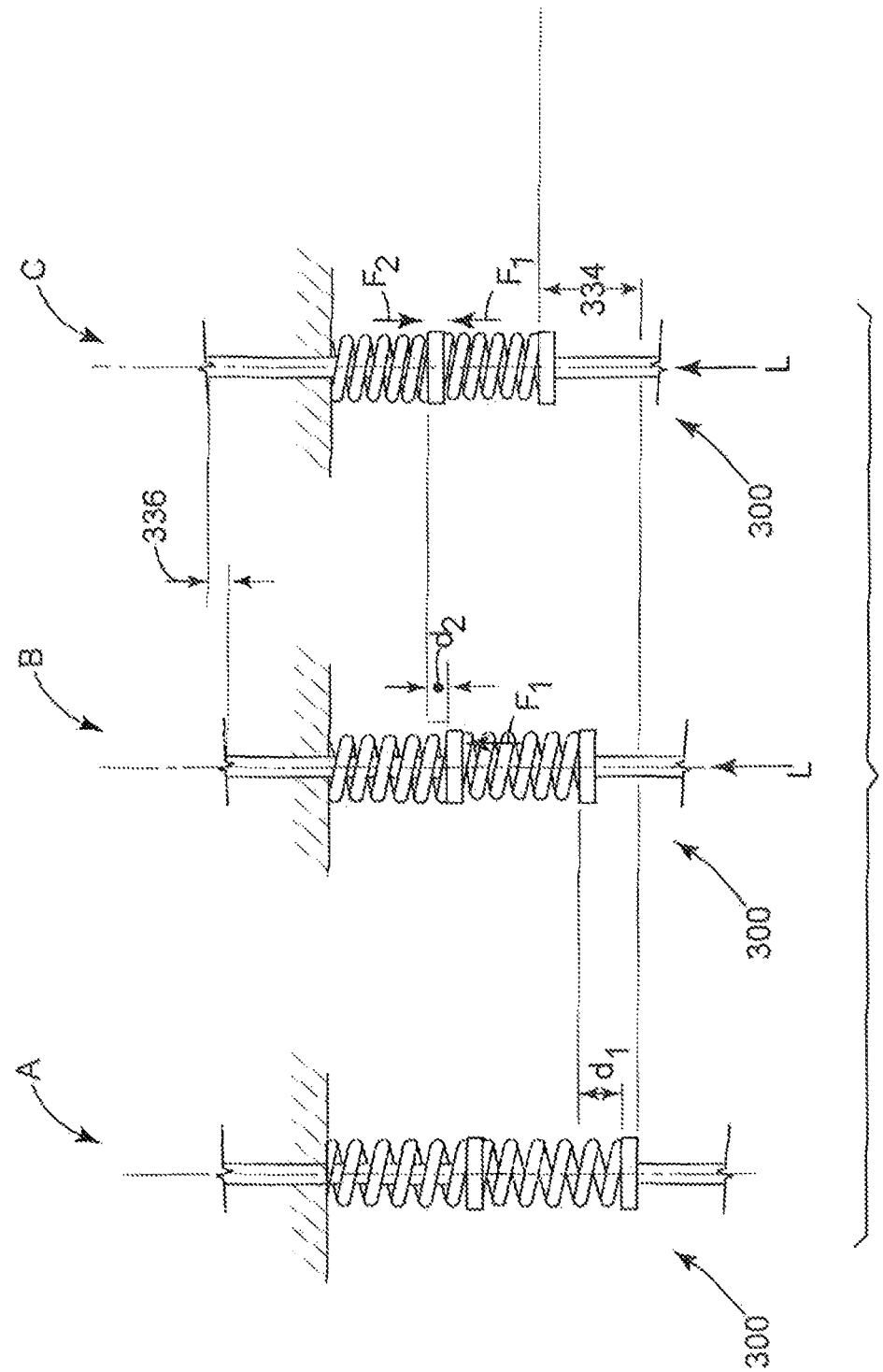

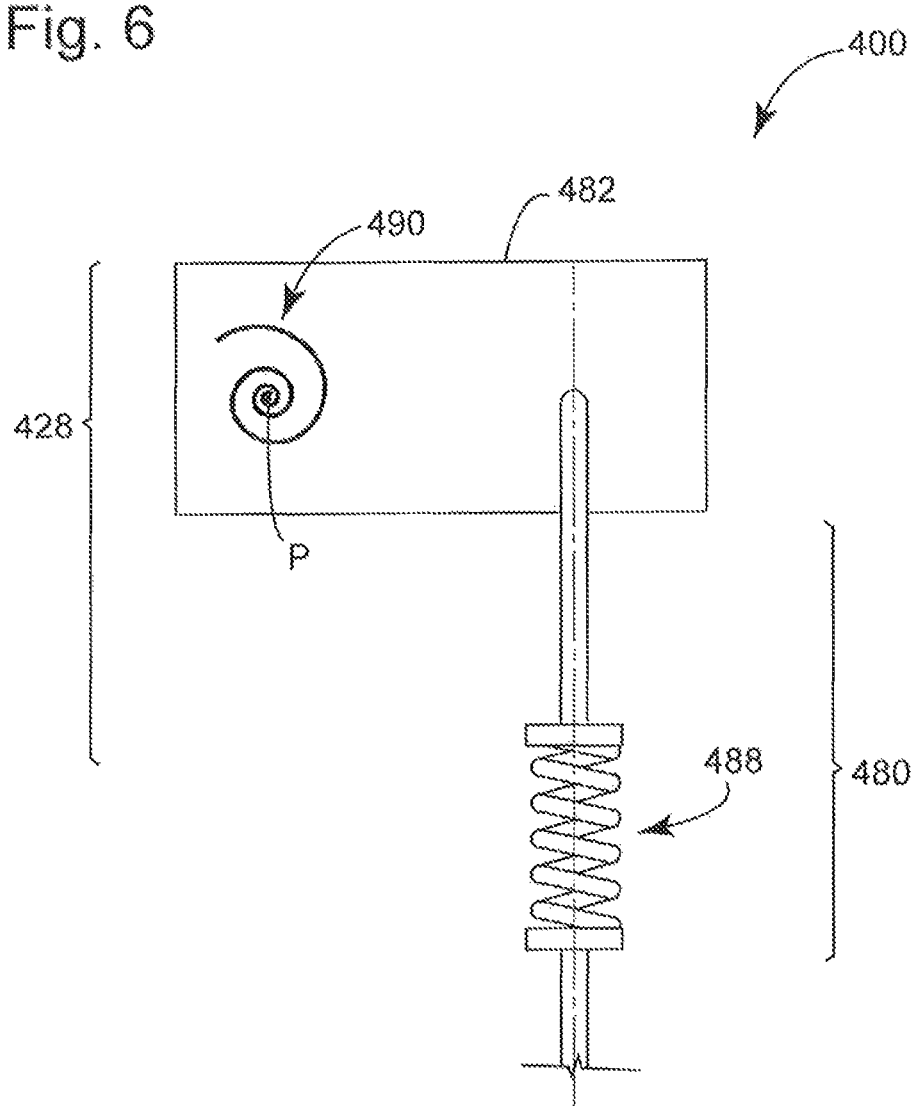

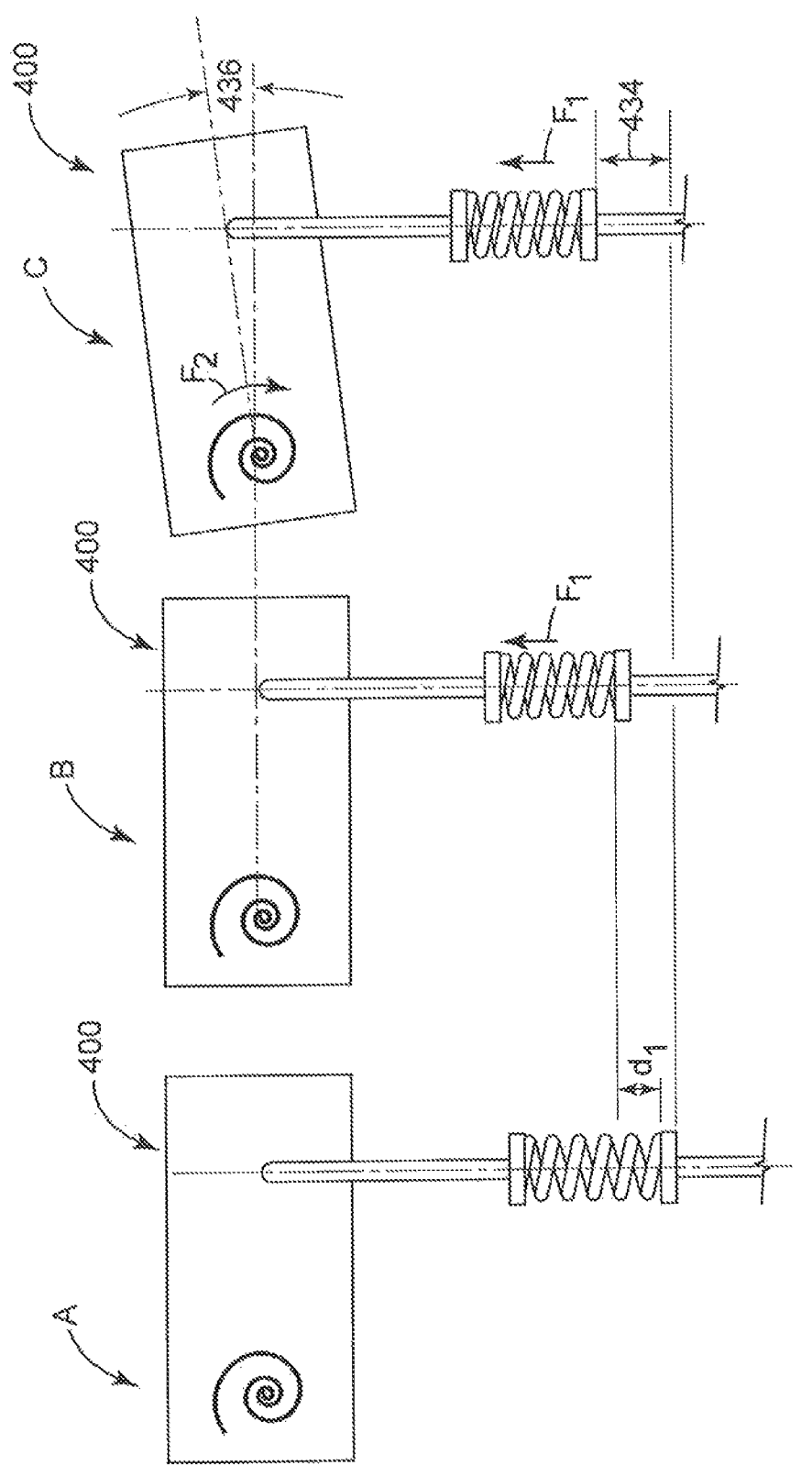

ATTENUATING DEVICE FOR VALVE ASSEMBLY

BACKGROUND

The subject matter disclosed herein relates to improvements in valve technology with particular discussion about embodiments of a modulating device that generates an output that relates to displacement of components in a valve assembly.

Valve assemblies like control valves can regulate flow of a process fluid in a process line. In their broadest configuration, these valve assemblies have a valve component with a plug (or moving element) that moves relative to a seat (or stationary element). This configuration also includes an actuator component that utilizes pneumatic signals (or flow of working fluid) to change the position of the plug. The actuator component can have a diaphragm (or actuating element) and a stem element that couples the diaphragm with the plug. During operation, the pneumatic signals cause movement of the diaphragm to set the position of the plug, often in accordance with signals that originate from a process control system. These signals instruct operation of the valve assembly to define an amount of process fluid that flows through the valve assembly and, thus, maintain operating conditions across the process line.

Operating conditions in many processes are sensitive to even small deviations in the amount of process fluid that flows through the valve assembly. This feature warrants construction of the valve assembly in a manner that can accurately and repeatability position the plug relative to the seat. Often, the valve assembly incorporates a valve positioner and a sensor, or like device, that measures the relative movement of the actuator (or its constituent components). This sensor provides feedback to the valve positioner about displacement of the plug relative to the seat. The valve positioner can use this feedback to regulate the pneumatic signals, which in turn operates the actuator to position the plug relative to the seat to within some reasonable operating tolerances or thresholds.

Most facilities with process lines allocate only a finite amount of power for operation of the valve assembly. This power constraint can influence design choices, namely for sensors and other electronics that are found on the valve assembly. For example, designs for the valve assembly may incorporate sensors (e.g., Hall Effect sensors) that consume less power than other sensors. These low power sensors often have an operating range (or detecting range) that is narrow relative to these other sensors that consume more power.

Unfortunately, the position of the plug relative to the seat may require movement of the actuator that exceeds the operating range of these low power sensors. Conventional designs for a valve assembly address this problem with a motion converter that reduces the relative movement of the actuator to motion that "fits" within the operating range of the sensor. Examples of the motion converter include linkages, lever arms, and/or cam-follower mechanisms, each of which can convert linear movement of the actuator to rotary displacement that fits within the operating range of the sensor. However, these mechanisms add cost and complexity to the valve assembly and, in many cases, are susceptible to defects in operation, wear, and damage due to dirt (and debris) and vibrations that prevail in and around the process line.

BRIEF DESCRIPTION OF THE INVENTION

This disclosure describes embodiments of an attenuating device to replace these motion converters. As discussed more below, these embodiments can generate an output displacement that is proportionally less than displacement necessary to move the plug. The embodiments, however, forgo the mechanisms of conventional devices in lieu of components that are amenable to compact design. In this way, the attenuating device can substantially fit within the existing structure of the valve assembly.

BRIEF DESCRIPTION OF THE DRAWINGS

Reference is now made briefly to the accompanying drawings, in which:

FIG. 4 depicts a schematic diagram of an exemplary embodiment of a attenuating device with resilient members in the form of linear springs disposed in series;

FIG. 5 depicts a schematic diagram of the attenuating device of FIG. 4 in several configurations to illustrate one implementation to attenuating motion in a valve assembly;

FIG. 6 depicts a schematic diagram of an exemplary embodiment of an attenuating device with resilient members in the form of a linear spring and a coils spring; and FIG. 7 depicts a schematic diagram of the attenuating device of FIG. 6 in several configurations to illustrate one implementation to attenuating motion in a valve assembly.

Where applicable like reference characters designate identical or corresponding components and units throughout the several views, which are not to scale unless otherwise indicated.

DETAILED DESCRIPTION

Figure 1:
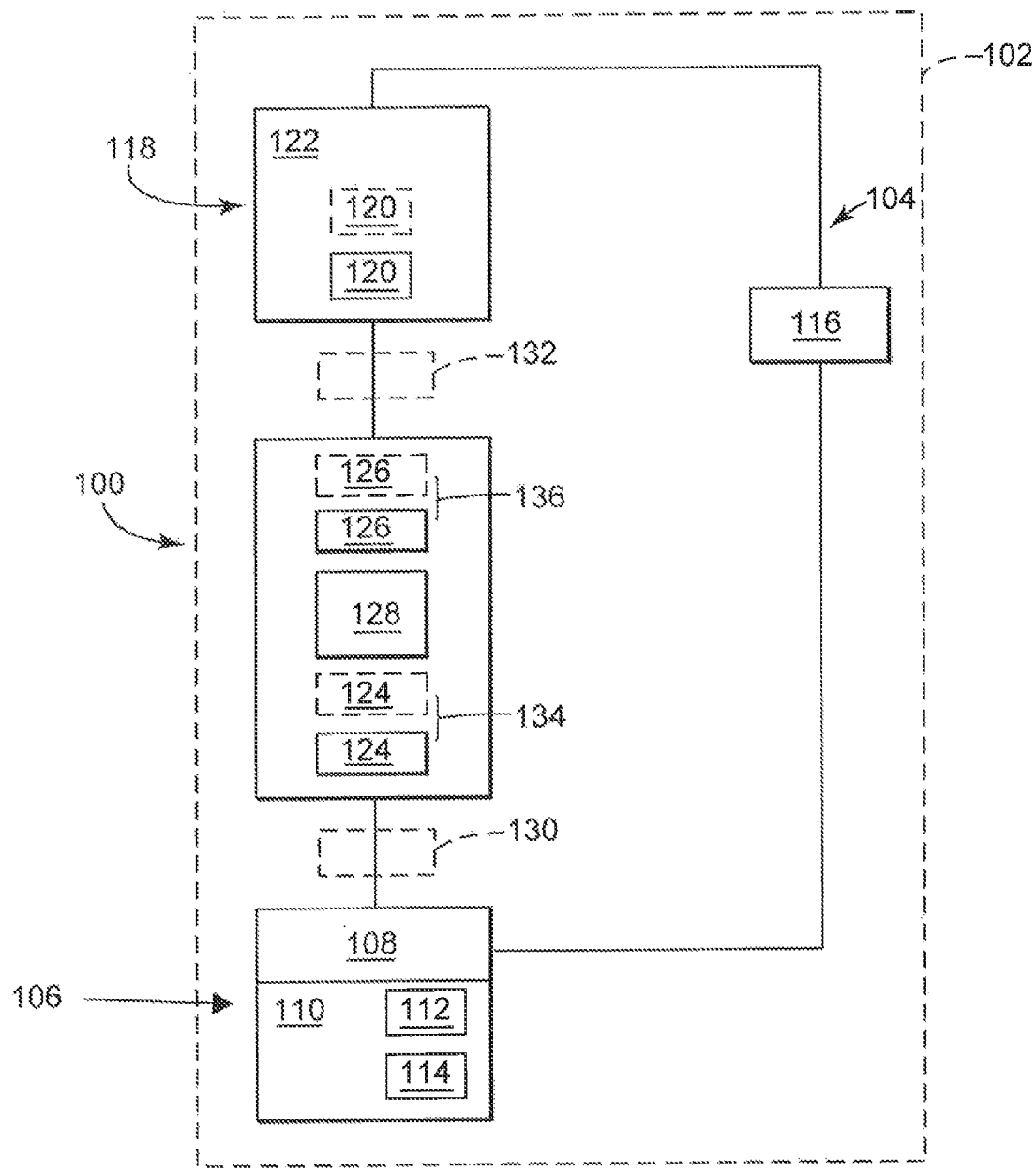
FIG. 1 depicts a schematic diagram of an exemplary embodiment of a modulating device.

FIG. 1 depicts a schematic diagram of an exemplary embodiment of an attenuating device 100. This embodiment resides in an operating envelope 102 that generally bounds all of the components of the valve assembly 104. The operating envelope 102 provides a hypothetical boundary that defines a volume of space about the valve assembly 104. For purposes of example, this volume can have a value that is about 10% larger than the volume of the valve assembly 104. As noted herein, the attenuating device 100 is also configured to fit inside of this volume along with all of the components of the valve assembly 104. These components may include a valve component 106 with an actuator 108 and a valve 110 with a plug 112 that moves relative to a seat 114. The valve assembly 104 can also include a valve positioner 116 that couples with a sensor member 118 to provide feedback about operation of the valve 110. The sensor member 118 can have a target member 120 that moves relative to a sensor 122. The valve positioner 116 couples with the actuator 108 to provide a pneumatic signal in response to a signal from the sensor member 118. In use, the actuator 108 regulates the position of the plug 112 relative to the seat 114, effectively defining an amount of process fluid that can flow through the valve component 106.

The attenuating device 100 is configured to mechanically convey the position of the plug 112 to the sensor member 118. As shown in FIG. 1, the attenuating device 100 may utilize a structure with one or more actuating members (e.g., a first actuating member 124 and a second actuating member 126) and an attenuating assembly 128, shown here interposed between the actuating members 124, 126. The attenuating device 100 can couple with the valve component 106 and/or the target member 120, either directly and/or through one or more intermediary components (e.g., a first intermediary component 130 and a second intermediary component 132). During operation, the first actuating member 124 moves (e.g., by a first displacement 134) in response to travel or motion of the valve component 106 (e.g., the valve stem, the actuator, the plug, etc.). The second actuating member 126 moves (e.g., by a second displacement 136), for example, in response to movement of the first actuating member 124. The second displacement 136 can change the position of the target member 120, thereby relaying the position of the plug 112 to the sensor member 118. In one example, the sensor member 118 can generate a measured value for the position of the plug 112 at a first distance from the seat 114, wherein the second displacement 136 corresponds with the measured value.

The components of the attenuating device 100 can be configured to provide structure that can accommodate large (or long) displacements necessary to appropriately position the plug 112 relative to the seat 114. Each of the actuating members 124, 126 can be configured for motive action (e.g., translation, rotation, etc.) that is useful to move the target member 120. In one example, this motive action embodies linear translation along an axis. The attenuating assembly 128 can be configured with an attenuating characteristic that regulates displacement 134, 136 of the actuating members 124, 126. This attenuating characteristic relates to properties of the members of the attenuating assembly 128. As noted in the examples below, these members may embody springs and like resilient members. Such resilient members may exhibit a spring constant suitable to regulate movement. This spring constant defines the attenuating characteristic of the attenuating assembly 128 to relate a value for the first displacement 134 to a value for the second displacement 136. This disclosure does, however, contemplates the use of other types of devices (e.g., hydraulic cylinders) that can serve to regulate displacement 134, 136. These devices may have properties (e.g., surface area, volume, etc.) that also define the attenuating characteristic of the assembly 128, as contemplated herein.

The attenuating characteristic of the assembly 128 can maintain the relationship between the first displacement 134 and the second displacement 136, but result in much smaller magnitude for the second displacement 136 relative to the first displacement. For example, in one configuration the second displacement 136 is different from the first displacement 134, and, often, the second displacement 136 is less than and/or proportionally less than the first displacement 134. This feature can configure the valve assembly 104 to accommodate translation of components within the valve component 106 that is necessary to move the plug 112, but that would otherwise outstrip the operating range of the sensor 122. However, unlike conventional valves, use of the attenuating assembly 128 can configure the attenuating device 100 to fit on the valve assembly 104 in a manner that does not extend outside of the operating envelope 102. In one implementation, the attenuating device 100 is configured to fit substantially within a housing and/or a casing that encloses the working components of the actuator 108. This feature offers improved performance as between conventional motion converters that are likely to extend, at least, outside of the operating envelope 102 in order to appropriately reduce displacement of, e.g., the actuator 108 that moves the plug 112 into position relative to the seat 114.

Figure 2:
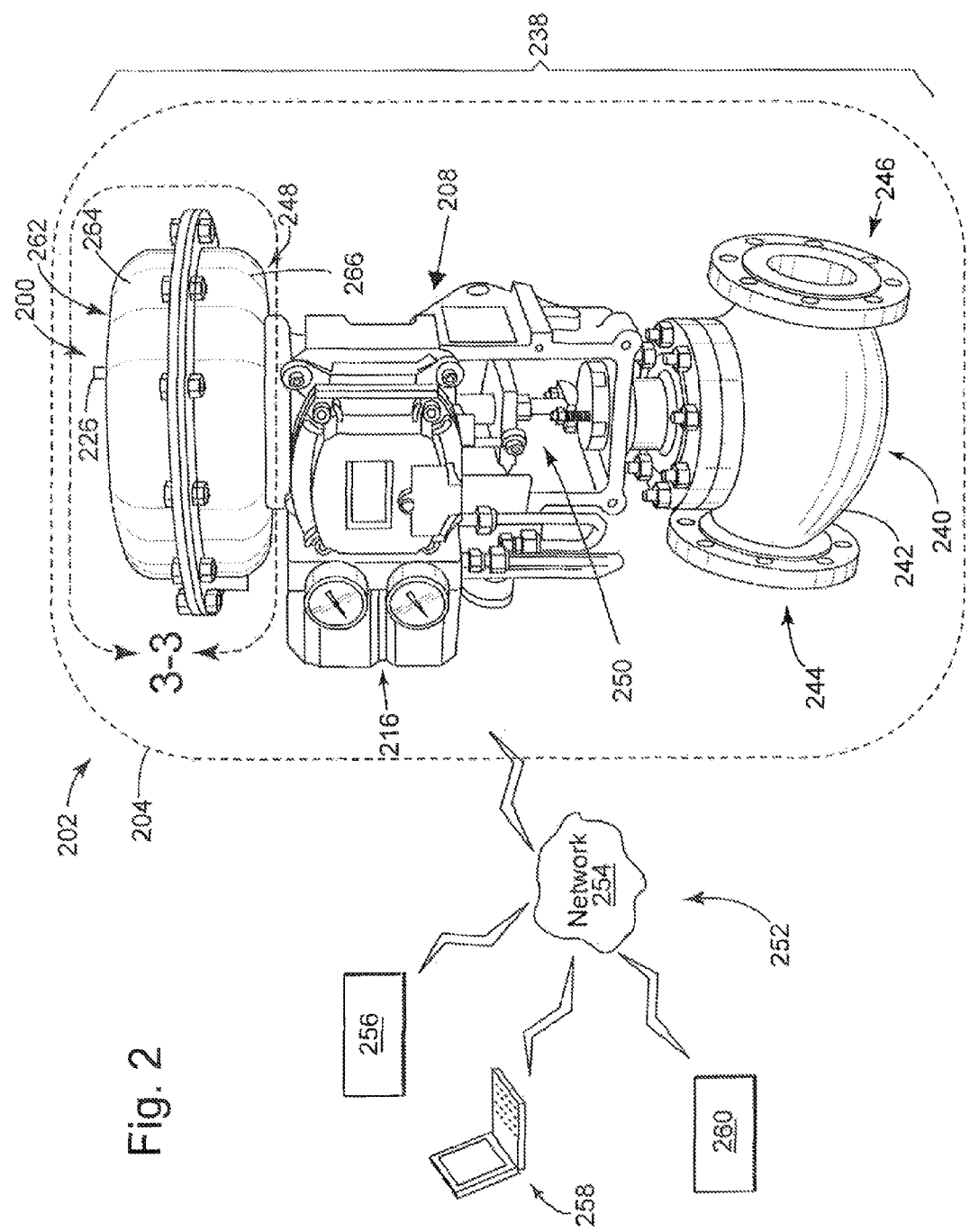
FIG. 2 depicts a perspective view of a valve assembly that can incorporate a attenuating device, e.g., the modulating device of FIG. 1.
Figure 3:
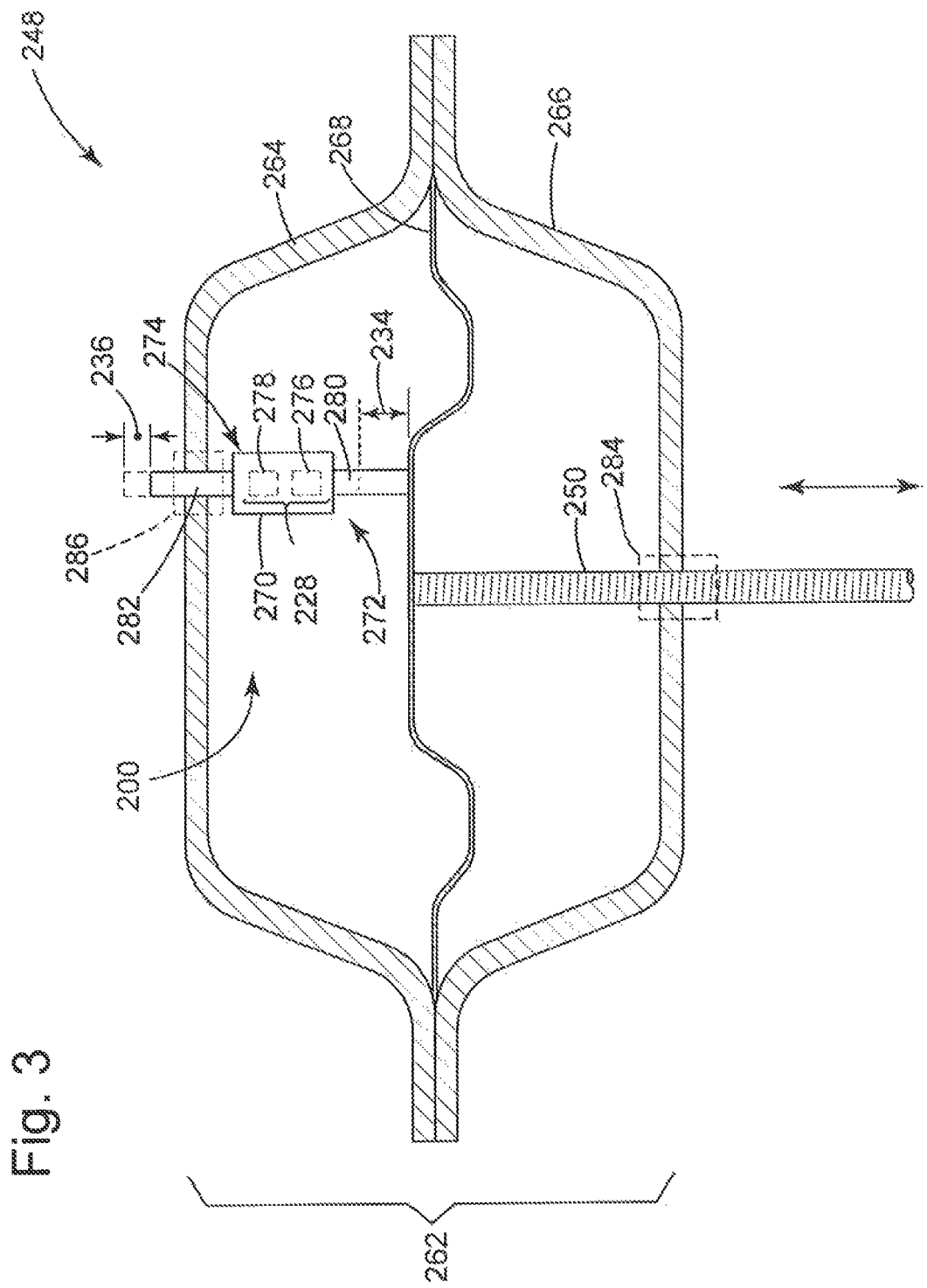
FIG. 3 depicts a detail view of the valve assembly of FIG. 2 that illustrates a elevation, cross-section of the attenuating device.

FIGS. 2 and 3 illustrate an exemplary embodiment of an attenuating device 200 that is configured to attenuate displacement during operation of the valve assembly 202. FIG. 2 is a perspective view of the valve assembly 202. FIG. 3 is a detail view of an elevation, cross-section of the valve assembly 202 that shows one implementation of the attenuating device 200. The valve assembly 202 in FIG. 3 has several parts removed for clarity.

In FIG. 2, the valve component 204 embodies a control valve 238 with a fluid coupling 240 with a body 242 that has a pair of inlet/outlets (e.g., a first inlet/outlet 244 and a second inlet/outlet 246). The fluid coupling 240 can also have a valve (e.g., valve 110 of FIG. 1) that resides in the body 242 and is thus not shown in the diagram of FIG. 2. As noted herein, the valve can be configured with a plug (e.g., plug 112 of FIG. 1) and a seat (e.g., plug 114 of FIG. 1) that work in combination to regulate flow of process fluid between the inlet/outlets 244, 246. The actuator 208 can include an actuating member 248 is configured to couple with a valve stem 250 that is configured to move the plug on the valve. In one implementation, the valve positioner 216 couples with a network system 252 via a network 254 that can transfer data, information, and signals by way of wired protocols (e.g., 4-20 mA, Foundation Fieldbus, etc.) and/or wireless protocols, many of which find use in a plant or factory automation environment. The network 254 facilitates communication between the valve positioner 216, a process control system 256, a terminal 258, and/or an external server 260. As also shown in FIG. 2, the actuating member 248 includes a housing 262 with one or more housing members (e.g., a first housing member 264 and a second housing member 266).

The attenuating device 200 can be disposed within the housing 262 to reduce the overall footprint of the control valve 238. In the present example of FIG. 2, the second actuating member 226 extends through the first housing member 264 to convey the change in position of the plug (not shown). Other embodiments of the attenuating device 200 may reside in different parts of the valve assembly 202. The attenuating device 200 may couple with the exterior structure of the valve assembly 202, for example, to provide feedback as to the position and/or displacement of the valve stem 250, which couples with the plug (not shown).

FIG. 3 depicts one configuration for the attenuating device 200 that can reside in the housing 262. In this configuration, the actuating member 248 also has a moving element, shown here as a diaphragm member 268 that couples with the valve stem 250. The attenuating device 200 has a body member 270 with a first end 272 and a second end 274. The attenuating assembly 228 can include one or more attenuating members (e.g., a first attenuating member 276 and a second attenuating member 278). At the first end 272, the first actuating member 276 can include an input member 280 that extends to and, in one example, couples with the diaphragm member 268. The second attenuating member 278, found at the second end 274, has an output member 282 that extends from the second end 274 through the housing 262 (here, through the first housing member 264). As also shown in FIG. 3, the actuating member 248 can include one or more seal members (e.g., a first seal member 284 and a second seal member 286) that configure the valve component 204 to maintain pressure inside of the housing 248.

Use of the attenuating device 200 can avoid the need for extraneous structure to extend outside the operating envelope 202 (FIG. 2) of the valve component 204. The body member 270 (and the attenuating members 276, 278) can be configured to fit within the interior cavity of the housing 262. During operation, movement of the diaphragm member 268 can cause the input member 280 to actuate from a first position to a second position that is spaced apart from the first position by the first displacement 234. The input member 280 can interface with the attenuating assembly 228 to cause the output member 282 to change position, e.g., from a third position to a fourth position that is spaced apart from the third position by the second displacement 236. In one implementation, displacement of the input member 280 can actuate one or more of the attenuating members 276, 278. The input member 280 can actuate the first attenuating member 276, for example, which in turn actuates the second attenuating member 278 to cause the output member 282 to change position, e.g., from the third position to the fourth position.

Construction of the attenuating members 276, 278 can utilize devices that facilitate the utility of the attenuating device 200 in a form factor that fits the operating envelope 202 as noted herein. As noted above, these devices can assign, or prescribe, the attenuating characteristic, which in turn defines the degree to which the displacement of the output member 282 is changed (e.g., reduced) relative to the displacement of the input member 280. Examples of the devices can embody actuators that operate, often in combination, so that the second displacement 236 is proportionally less than the first displacement 234. The actuators may utilizes one or more spring elements of varying mechanical properties, one or more piston actuators of varying size and stroke, hydraulic actuators that pass fluid between one or more fluid chambers of varying area, volume, and the like. The discussion that follows below describes configurations of actuators that are useful to attenuate movement, e.g., of the input member 280 and the output member 282. However, this disclosure does contemplate other configurations of actuators, and related construction and assembly, as possibly desirable for use to attenuate movement as noted herein.

FIG. 4 illustrates a schematic diagram of a cross-section of an exemplary embodiment of an attenuating device 300 to illustrate details for one construction of the attenuating assembly 328. The attenuating members 376, 378 can comprise one or more spring members (e.g., a first spring member 388 and a second spring member 390), disposed in series (or, also, "end-to-end"). The attenuating members 380, 382 can have a base element 392 and a shaft element 394, the combination of which can translate along a central axis 396.

Each of the spring members 388, 390 can be configured with physical characteristics that can help attenuate displacement of the members 380, 382. These characteristics include spring constant (also "spring rate"), wherein the spring constant for each of the spring members 388, 390 is selected to obtain a deflection for the attenuating assembly 328 that attenuates the displacement as desired. In the example of FIG. 4, each of the spring members 388, 390 embodies a linear coil spring (e.g., tension or compression). During operation, movement of the input member 380 will deflect the first spring member 388, causing the first spring member 388 to generate a force in accordance with Equation (1) below, $$F_1 = k_1 d_1, \qquad \text{Equation (1)}$$

wherein $F_1$ is the force, $k_1$ is the spring constant for the first spring member, and $d_1$ is a first deflection of the first spring member. The interface member 398 can transfer the force $F_1$ to the second spring member 390, which in turn will deflect an amount in accordance with Equation (2) below, $$d_2 = \frac{F_1}{k_2}, \qquad \text{Equation (2)}$$

wherein $F_1$ is the force, $k_2$ is the spring constant for the second spring member, and $d_2$ is a second deflection of the second spring member. The relationship between the spring members can be tuned using the spring constants to vary the amount and/or extent of deflection and, thus, vary the displacement of the output member 382 relative to the displacement of the input member 380. Notably, as the second spring constant $k_2$ becomes much larger than the first spring range $k_1$, the second spring member will generate a opposing force that is much larger (and in the opposite direction of) the force $F_1$ of the first spring member. This feature maintains the second displacement at the output member 382 much less relative to the first displacement at the input member 380.

FIG. 5 depicts diagrams of an exemplary embodiment of the attenuating device 300 that demonstrates several configurations of the device during operation. Some parts of the attenuating device 300 are removed for clarity. In FIG. 5, the attenuating device 300 is shown in a first configuration A, typical of operation of the valve component with one or more components in a first position. The attenuating device 300 in also shown in a second configuration B with the first resilient member 388 (FIG. 4) having a first deflection $d_1$ under a load L. The second configuration B can generate the force $F_1$, noted above. The second configuration B can reflect the configuration of the attenuating device 300 in response to a change in position of the plug on the valve component. The attenuating device 300 is also shown in a third configuration C with the second spring member 390 (FIG. 4) having a second deflection $d_2$ that generates an opposing force $F_2$. In the third configuration C, each of the members 380, 382 (FIG. 4) are in position to reflect the change in position of the plug that, as noted herein, correspond with displacements 334, 336. The third configuration C may occur in response to the first spring member 388 (FIG. 4) reaching the end (or near the end) of deflection $d_1$. In use, the third configuration C may reflect the configuration of the attenuating device 300 in response to a change in position of the plug on the valve component (e.g., from the first position to a second position).

FIG. 6 depicts a schematic diagram of an exemplary embodiment of an attenuating device 400 to illustrate details for another construction of the attenuating assembly 428. In this construction, the output member 482 operates as a pivot arm with a pivot P. The first spring member 488 embodies a linear coil spring. On the other hand, the second spring member 490 embodies a torsion spring (or like resilient element that generates spring force by torsion and/or twisting).

FIG. 7 depicts diagrams of an exemplary embodiment of an attenuating device 400 that demonstrates several configurations of the device during operation. In FIG. 7, the attenuating device 400 is shown in a first configuration A, typical of operation of the valve component with one or more components in a first position. The attenuating device 400 in also shown in a second configuration B with the first resilient member 488 (FIG. 6) having a first deflection $d_1$ under a load L. The second configuration B can generate the force $F_1$, noted above. The attenuating device 400 is also shown in a third configuration C in which the second spring member 490 (FIG. 6) will have a second, angular displacement (e.g., displacement d2). This angular displacement will generate an opposing, torsion force $F_2$. In the third configuration C, each of the members 480, 482 (FIG. 6) are in position to reflect the change in position of the plug. The third configuration C may occur in response to the first spring member 488 (FIG. 6) reaching the end (or near the end) of deflection $d_1$. In use, the third configuration C can reflect the configuration of the attenuating device 400 in response to a change in position of the plug on the valve component (e.g., from the first position to a second position).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
   a valve having a seat and a plug that is configured to move a first distance relative to the seat;
   an actuator coupled with the plug, the actuator comprising a housing with a diaphragm disposed therein; and
   an attenuating device disposed in the housing of the actuator, the attenuating device having an input member and an output member, both being configured to translate in response to movement of the diaphragm, the attenuating device comprising a pair of resilient members and a first disc, all found entirely within the housing and arranged linearly relative to one another and interposed between the input member and the output member, the first disc disposed between the pair of resilient members so that the pair of resilient members contact opposing sides of the first disc, respectively, each of the pair of resilient members being configured to deflect in accordance with an attenuating characteristic for the attenuating device that reduces a first displacement of the input member to a second displacement of the output member that is less than the first displacement,
   wherein the second displacement corresponds with a measured value for a position of the plug at the first distance.

2. The valve assembly of claim 1, wherein the attenuating characteristic is configured so that the second distance is proportionally less than the first distance.

3. The valve assembly of claim 1, wherein the pair of resilient members comprise springs, and wherein the attenuating characteristic corresponds with a deflection of the springs interposed between the input member and the output member.

4. The valve assembly of claim 3, wherein the springs are configured to assume the deflection.

5. The valve assembly of claim 3, wherein the springs are disposed in series.

6. The valve assembly of claim 3, wherein the springs comprise a first spring and a second spring, and wherein the deflection comprises a first deflection for the first spring and a second deflection for the second spring that is different from the first deflection.

7. The valve assembly of claim 1, further comprising a sensor and a target member that is configured to move a second distance relative to the sensor to register the measured value for the position of the plug, and wherein the second distance corresponds with the second displacement of the output member.

8. The valve assembly of claim 7, wherein the second distance is less than the first distance.

9. The valve assembly of claim 1, wherein the input member couples with the diaphragm.

10. The valve assembly of claim 1, wherein the input member contacts the diaphragm.

11. The valve assembly of claim 1, wherein the output member extends through the housing.

12. The valve assembly of claim 1, wherein the attenuating device comprises a shaft that couples to the output member and the first disc.

13. The valve assembly of claim 1, wherein the attenuating device comprises a shaft disposed interior to one of the pair of resilient members to couple the output member and the first disc.

14. The valve assembly of claim 1, wherein the attenuating device comprises a shaft and the pair of resilient members comprises a coil spring, and wherein the shaft extends inside coils of the coil spring to couple the output member and the first disc.

15. The valve assembly of claim 1, wherein the attenuating device comprises a second disc disposed in contact with only one of the pair of resilient members.

16. The valve assembly of claim 1, wherein the attenuating device comprises a second disc spaced apart from the first disc proximate the diaphragm.

17. The valve assembly of claim 1, wherein the attenuating device comprises a second disc between the input member and the output member in a position closer to the diaphragm than the first disc.

18. The valve assembly of claim 17, wherein only one of the pair of resilient members is interposed between the first disc and the second disc.

19. The valve assembly of claim 1, wherein the attenuating device comprises a body member that encloses the pair of resilient members, wherein the body member is disposed entirely within the housing.

20. The valve assembly of claim 1, further comprising a seal disposed in the housing to receive the output member therein and maintain pressure inside the actuator.

* * * * *